US005791837A

United States Patent [19]
Johnson

[11] Patent Number: 5,791,837
[45] Date of Patent: Aug. 11, 1998

[54] ANNULAR TOOL FOR CUTTING HOLES IN METAL

[76] Inventor: Samuel Johnson, 3743 Thayer Rd., Moses Lake, Wash. 98837

[21] Appl. No.: 699,146

[22] Filed: Aug. 16, 1996

[51] Int. Cl.$^6$ ...................................................... B23B 51/04
[52] U.S. Cl. ........................... 408/204; 408/206; 408/703
[58] Field of Search ............................ 408/68, 204, 205, 408/206, 207, 209, 703

[56] References Cited

U.S. PATENT DOCUMENTS

| | | | |
|---|---|---|---|
| 1,855,873 | 4/1932 | Shortell | 408/206 |
| 2,794,469 | 6/1957 | Shortell | 408/206 |
| 2,856,157 | 10/1958 | Chapin et al. | 255/69 |
| 2,969,122 | 1/1961 | Steffes | 175/394 |
| 3,244,035 | 4/1966 | Jehle et al. | 77/69 |
| 3,390,596 | 7/1968 | Trevathan | 408/68 |
| 3,493,268 | 2/1970 | Bower, Jr. | 299/86 |
| 3,847,236 | 11/1974 | Coalson | 175/383 |
| 4,072,441 | 2/1978 | LaPointe | 408/204 |
| 4,079,796 | 3/1978 | Staggs et al. | 175/383 |
| 4,408,935 | 10/1983 | Miyanaga | 408/206 |
| 4,452,554 | 6/1984 | Hougen | 408/206 |
| 4,516,890 | 5/1985 | Beharry | 408/204 |
| 4,596,499 | 6/1986 | Fangmann et al. | 408/204 |
| 4,915,182 | 4/1990 | Magyuri et al. | 175/403 |
| 5,007,777 | 4/1991 | Itokazu | 408/206 X |
| 5,082,070 | 1/1992 | Obermier et al. | 175/403 |

FOREIGN PATENT DOCUMENTS

| | | | |
|---|---|---|---|
| 2232619 | 12/1990 | United Kingdom | 408/204 |
| 2278793 | 12/1994 | United Kingdom | 408/204 |

*Primary Examiner*—A. L. Pitts
*Assistant Examiner*—Henry W. H. Tsai
*Attorney, Agent, or Firm*—Keith S. Bergman

[57] ABSTRACT

A tool for cutting holes in metal provides a shank defining at one end an arbor releasably carrying a circularly annular cutter that defines teeth at each cutter end which may be sequentially used to extend cutter life without sharpening. The annular cutter defines a plurality of spirally arrayed, inwardly extending flutes and alternating outwardly extending lands on both inner and outer sides to provide cutting edges on both cutter sides at each end. The lands are formed with buttress type sides angulated ten to sixty degrees to a radius passing therethrough steeper spiral arrays of lands and grooves are arrayed in shallower spirals with an angle of up to seventy degrees to the axis of the cutter to allow thinner wall construction in my cutter than in prior cutters. The thinner cutter wall allows definition of more cutting teeth than would thicker walls and the cutter configuration allows definition of stronger, more efficient teeth without gullets. A species of the tool provides a medial support disk that is axially movable within the channel defined by the cutter to stiffen the cutter to allow still thinner wall construction.

12 Claims, 3 Drawing Sheets

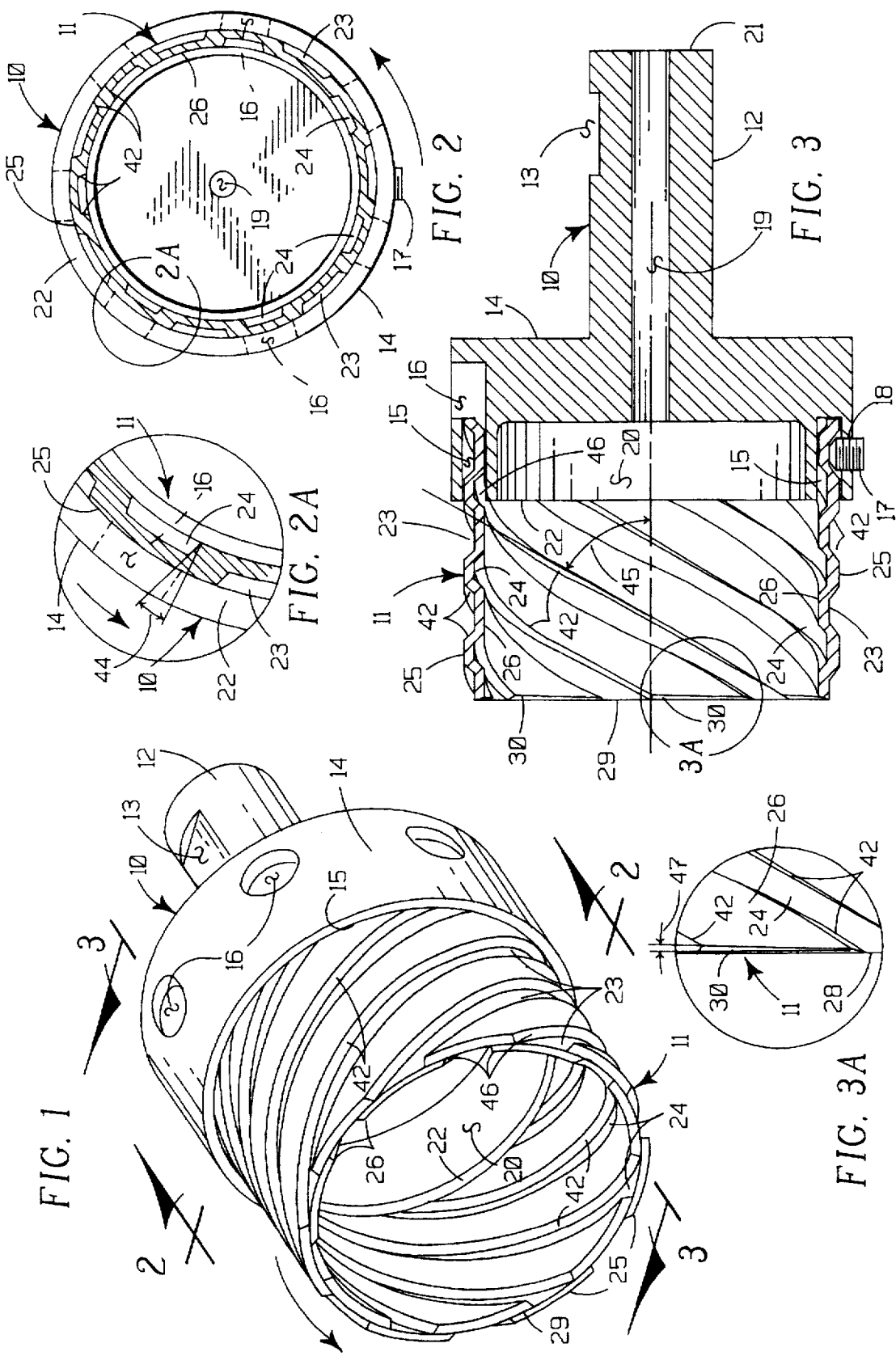

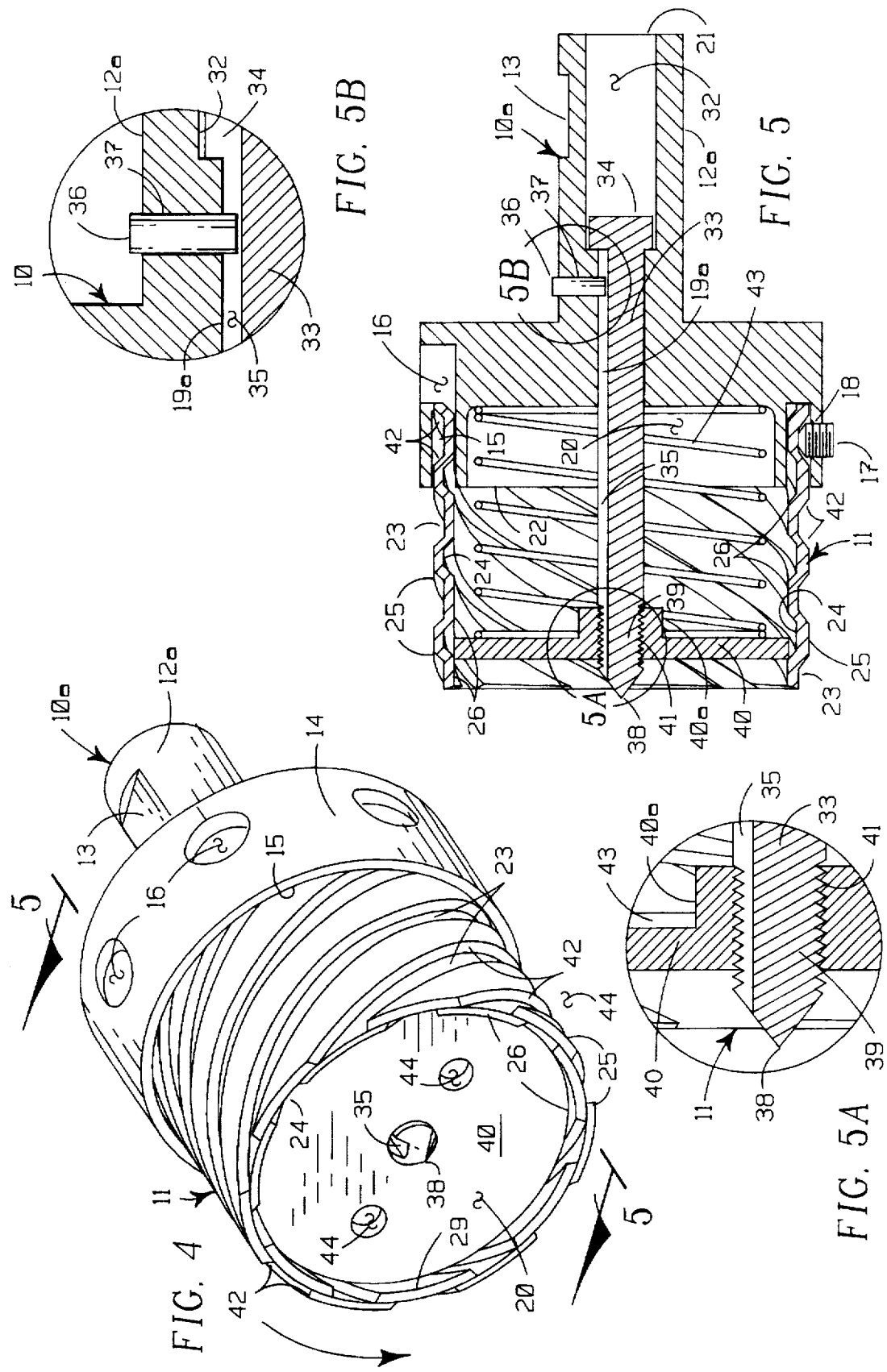

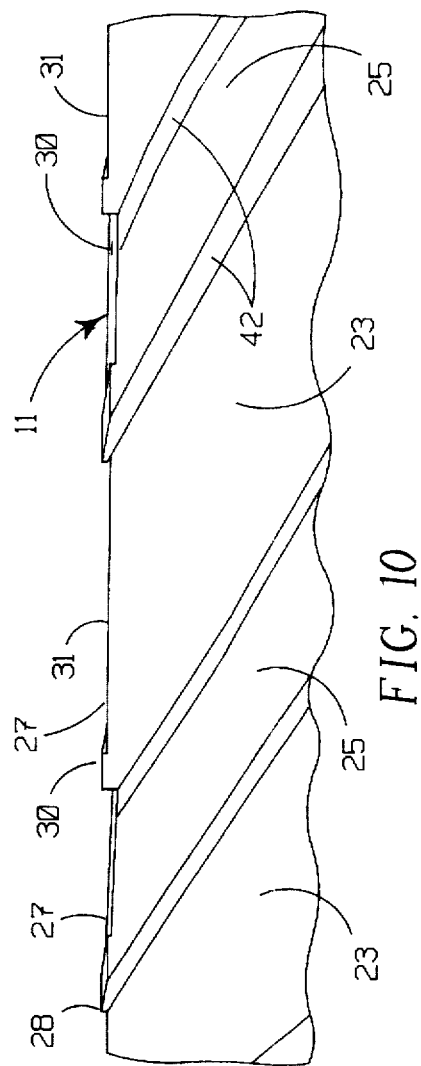
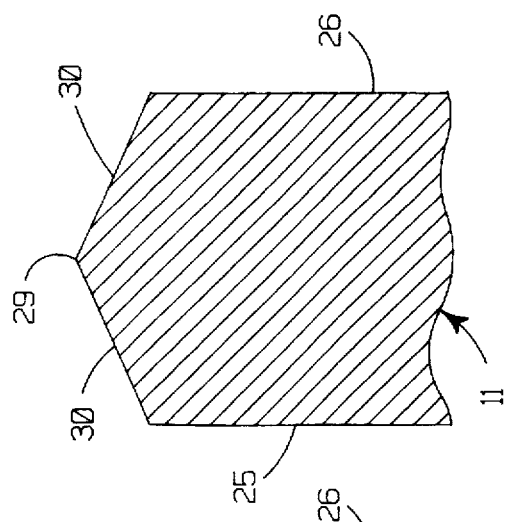
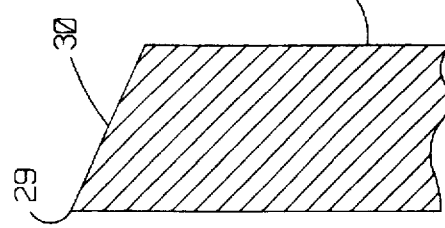
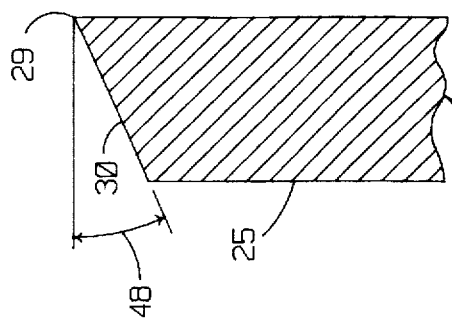
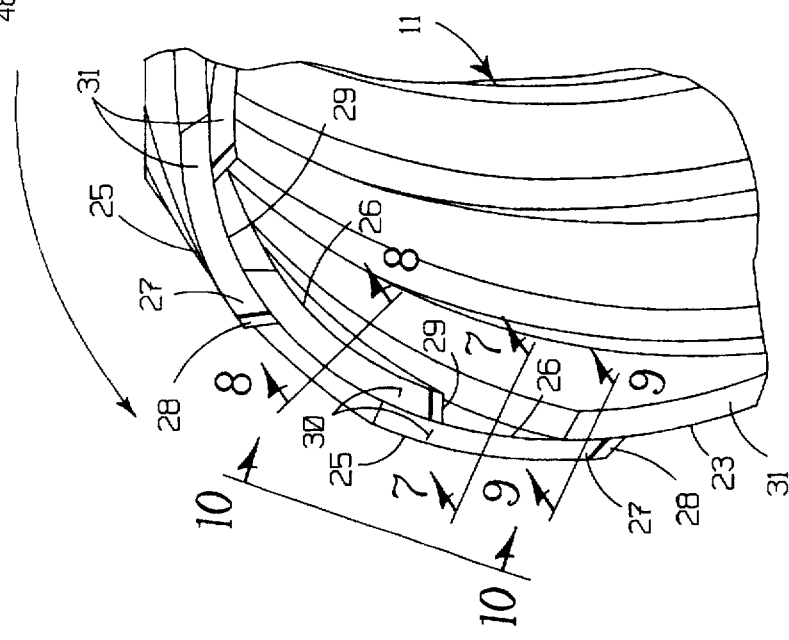

ANNULAR TOOL FOR CUTTING HOLES IN METAL

RELATED APPLICATIONS

There are no applications related hereto heretofore filed in this or any foreign country.

BACKGROUND OF INVENTION

1. Field of Invention

This invention relates generally to rotary annular tools for cutting holes in metal, and more particularly to such a tool having a mounting shank releasably carrying a thin annular cutter defining teeth at both ends for sequential use.

2. Background and Description of Prior Art

Annular drilling tools have long been known for creating holes, especially larger holes in harder materials such as metals. These tools remove only an annular band of material inward of the periphery of a hole without disturbing the central core material and therefore generally require less power and torque for hole creation, require less feeding force and create less wear on the drilling tool then a drill that cuts all of the material within the boundary defining a hole. Though the history of annular drills has been lengthy and their structures have become quite sophisticated, problems still remain that have limited their use and the effectiveness of that use. The instant invention seeks to provide an improved annular drilling tool that resolves or lessens various of these remaining problems.

Prior annular drills have provided relatively thick bodies that have been required to withstand stresses developed therein because of their configuration and the nature and operation of their cutting teeth. Such cutters define flutes on at least one of their cylindrical surfaces to allow the removal of material cut by cutting edges of teeth defined in the cutting end. Historically the sides of these flutes have been substantially perpendicularly oriented to the lands between the flutes to extend in a radial direction to the cylindrical body of a cutter, in some instances with a small transition radius between the land side and adjacent flute bottom. The stress concentration in the lands between such flutes, especially in the area adjacent cutting teeth weakened by traditional gullets, is substantial and since the cutters are formed of hard and relatively brittle materials, a substantial thickness of the cutter body is required to withstand the stresses imposed upon the element. In contradistinction, I provide lands between flutes in my cutter that have sides that are less sharply angulate than those of the prior art to create a buttress effect that considerably reduces stress concentration about teeth and elsewhere to allow a substantially thinner wall in my cutter.

The angulate sides of the lands provide a secondary benefit in defining a longer cutting surface for the cutting teeth of the tool so that chips created by it will be thinner and wider for a given depth of cut than with traditional cutters to require less cutting force, produce less strain on the cutting teeth, and produce more flexible chips that are easier to remove. Another secondary benefit is to allow the use of flute spirals of more angulated nature without lessening the strength of the cutting edges of the tool. These spirals may have lead angles of up to seventy degrees from the cutter axis and this spiral angulation combined with the angulated flute sides produces less bending of cut chips to require less curving of the chips between a cutting tooth edge and a land side to increase efficiency of cutting and lessen power consumption and heat generation.

The wall of my cutter is substantially thinner than walls of prior annular cutters to provide multiple advantages over those prior cutters. The thinner wall structure requires less metal removal than do thicker walled cutters and thus reduces the force and total power required for the cutting of a hole. This is especially important if the cutter is used with portable magnetic drilling tools which are positionally maintained on a workpiece by electromagnets, as both the magnets and the motor in the drilling tool may be smaller in size and consume less power to allow lighter, more portable and more easily handled magnetic drills of greater efficiency.

The thinner cutter wall allows more cutting teeth in my tool and this begets faster cutting, longer tool life and reduced power consumption. Moreover, the cutting action is synergistically enhanced because the greater number of teeth succeed each other over a given point on a workpiece more rapidly than would a lesser number of teeth so that heat generated by the cutting action and residing in the underlying uncut material has less time to dissipate to maintain a higher temperature in the cutting area than is maintained by prior thicker wall cutters having fewer teeth. This higher temperature in the substrate provides a softer material that can be sheared with less force to further reduce power consumption and increase tool life. The larger number of teeth in my cutter also allows use of smaller relief angles than required by prior cutters with fewer teeth.

The thinner wall of my cutter also produces less total heat and a heavier slug that can retain more heat to result in less temperature increase and consequently less thermal expansion in the slug and workpiece than smaller slugs cut by prior thicker walled cutters. The lower thermal expansion allows the slug to be ejected more easily from the tool. The thinner cutter wall also produces a heavier slug and reduced volume of chips to provide scrap that is more valuable and easier to handle than the smaller slugs and greater mass of chips produced by prior cutters.

The thinner wall of my cutter combined with its tubular configuration allows manufacture by various methods not possible with prior annular cutters, such as by centrifugal or investment casting, sheet metal forming techniques or electroforming. The use of these various alternative methods for tool formation allows the use of cutting alloys that could not be configured by known manufacturing methods into the forms required by prior annular cutters. If my tool is manufactured from rolled bar stock, the steeper spirals of the tool's lands and flutes aid the use of this material as these spirals direct stress away from the weaker axial direction in the rolled stock and distribute the stress toward the stronger traverse direction.

My cutter is further distinguished from prior annular cutters in that it has cutting teeth at both ends and it is releasably mounted on an arbor to allow reversal for sequential use of each end to substantially double the life of a particular cutter. The arbor not only provides support for the cutter but also aids in maintaining the cutter's circular configuration. This compound construction provides an additional benefit by allowing the arbor and interconnected shank to be formed of different material than the cutter so that the arbor and shank may be formed of ordinary, tougher inexpensive steel rather than expensive cutting alloy required for the cutter to considerably reduce the overall cost of the tool. The lower cost coupled with the longer life of the cutter allows the tool to be of an expendable or "throwaway" nature, and it therefore is not necessary to sharpen the tool so the cutter may be shorter to further reduce cost.

My cutter is further distinguished from prior cutters in that it has flutes defined both on the inside and outside walls.

This allows elimination of the gullets required by prior cutters to avoid the stress concentration in teeth produced by the gullets.

If my cutter is thin enough so as not to maintain the integrity of its circular configuration during heat treatment or during use by reason of vibrational wobble or otherwise, a species provides a support disk that moves axially in the cutter interior. Such a support disk allows the cutter wall of my tool to be even thinner than it could be without use of the disk.

My invention resides not in any one of these features individually, but rather in the synergistic combination of all of the structure of my tool that necessarily give rise to the functions flowing therefrom as herein specified and claimed.

SUMMARY OF INVENTION

My tool provides a mounting shank having at a first end an arbor irrotatably carrying a circularly annular cutter that is releasably interconnected thereto and extends away from the shank. The second end of the mounting shank is configured to operatively interfit with existing powering or holding devices.

The annular cutter defines on both inner and outer cylindrical surfaces a plurality of alternating flutes and lands that define cutting teeth on both sides of the cutter at each end. The sides of the lands between flutes are formed by angulated surfaces that extend away from the outer surface of the lands to create buttress-like land structures to increase strength. The stronger land structure allows the cutter to be formed of thinner material, allows narrower and more numerous flutes and lands, and allows the flutes and lands to spiral about the cutter surface at angles of up to 70 degrees to the cutter axis. The more narrow and numerous lands and grooves allow more teeth on my cutter than on prior thicker cutters. The releasable mounting of the cutter on the shank allows the teeth at both ends of the cutter to be used sequentially. A species of cutter provides a support disk axially movable in the cutter channel to maintain cutter configuration.

In creating such a cutter, it is:

A principal object to provide a tool to cut circular holes in metal that has a mounting shank with an arbor releasably interconnecting an annular cutter with cutting teeth defined at both ends so that the cutter may be reversed on the arbor for sequential use of the cutting teeth at each end.

A further object is to provide such a cutter that has alternating spirally arrayed lands and flutes with sides therebetween angulated from ten to sixty degrees to a radius passing through the land edges to provide buttress-type support of the lands that is of greater strength than the support provided for in prior lands formed with perpendicular radially extending sides.

A further object is to provide such a cutter that has flutes and lands defined on both its radially inner and outer sides to allow cutting and chip removal on both cutter sides.

A further object is to provide such a cutter that has a thin wall that allows a greater number of narrower flutes and lands and creates a larger slug and less chips to increase the efficiency of cutting and the value of scrap, as well as to lessen the total heat generated in creating a hole and temperature rise in the slug to make slug removal easier.

A still further object is to provide such a cutter having teeth without traditional gullets to minimize the stress concentration about the cutter teeth that is detrimental to cutting tools of relatively hard and brittle material.

A still further object is to provide such a tool that allows formation of the shank and arbor from different materials than the cutter to allow use of various modern manufacturing processes that are more efficient and less costly than could be used in the production of prior annular cutters because of their unitary nature and configurational requirements.

A still further object is to provide a species of such tool that has an axially movable support disk carried in the channel defined by the cutting cylinder to aid maintenance of the integrity of the circular configuration of the cutter to allow a thinner wall structure.

A still further object is to provide such an annular cutter that is of new and novel design, of rugged and durable nature, of simple and economic manufacture and one otherwise well suited to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one preferred and practical embodiment of the best known mode being illustrated in the drawings and described in the specification as is required.

BRIEF DESCRIPTION OF DRAWINGS

In the accompanying drawings which form a part hereof and wherein like numbers of reference refer to similar parts throughout:

FIG. 1 is an isometric surface view of a first species of my cutter tool showing its various parts, their configuration and relationship.

FIG. 2 is a medial transverse cross-sectional view through the cutter of FIG. 1, taken on the plane 2—2 thereon in the direction indicated by the arrows.

FIG. 2A is an enlarged portion of the cross-sectional view of FIG. 2 taken within the circle 2A thereon to better show detail.

FIG. 3 is a medial elongate cross-sectional view through the cutter of FIG. 1, taken on the plane 3—3 thereon in the direction indicated by the arrows.

FIG. 3A is an enlarged portion of the cross-sectional view of FIG. 2, taken within the circle 3A thereon.

FIG. 4 is an isometric surface view of a second species of my cutter tool having a support disk axially movable in the cutter channel.

FIG. 5 is a medial elongate cross-sectional view through the cutter of FIG. 4, taken on the line 5—5 thereon in the direction indicated by the arrows.

FIG. 5A is an enlarged portion of the cross-sectional view of FIG. 5, taken within the circle 5A thereon.

FIG. 5B is an enlarged portion of the cross-sectional view of FIG. 5, taken within the circle 5B thereon.

FIG. 6 is a partial isometric view of the teeth of the cutter of FIG. 1.

FIG. 7 is an enlarged radial cross-sectional view through a radially outer cutter tooth of the cutter of FIG. 6, taken on the line 7—7 thereon in the direction indicated by the arrows.

FIG. 8 is an enlarged radial cross-sectional view through a radially inner cutter tooth of the cutter of FIG. 6, taken on the line 8—8 thereon in the direction indicated by the arrows.

FIG. 9 is an enlarged radial cross-sectional view through a section of both inner and outer cutter teeth of the cutter of FIG. 6, taken on the line 9—9 thereon in the direction indicated by the arrows.

FIG. 10 is an enlarged partial side view of a portion of the teeth of the cutter of FIG. 6, taken as on a line 10—10 thereon in the direction indicated by the arrows.

DESCRIPTION OF PREFERRED EMBODIMENT

My cutter tool generally provides mounting shank 10 carrying releasably attached annular cutter 11.

As seen in FIGS. 1-3 showing the first species of my tool, mounting shank 10 provides elongate, circularly cylindrical powering shaft 12 having a segmental portion removed to form notch 13 to interfit with cooperating standardized fastening mechanisms (not shown) of powering tools or supports of commerce to maintain the shaft in an irrotatable interconnection therewith. The powering shaft 12 is structurally joined to shank arbor 14 of shorter axial length and greater diameter than the powering shaft. The forward surface of the shank arbor 14, distal from the powering shaft, defines concentric circular fastening groove 15 sized and configured to accept in immediate adjacency the rearward portion of annular cutter 11 to allow configurationally sustaining, releasable joinder of the cutter to the shank arbor.

Chip channels 16 are defined in circumferential positions coincident with internal flutes of the cutter to extend through the outer circumferential surface of the shank arbor 14 to allow the passage and exit of cut chips from the internal cutter flutes. At least one fastening screw 17 is threadedly engaged in at least one hole 18 that extends from the external cylindrical periphery of the shank arbor 14 into the annular fastening groove 15 to fasten the cutter therein in an irrotatable fashion. Both powering shaft 12 and shank arbor 14 define interconnecting medial channels 19 and 20, respectively, extending therethrough from the rearward face 21 of the powering shaft to the forward face 22 of the arbor.

The dimensioning of the powering shaft 12 is not critical to my invention, but must be such as to provide appropriate strength and rigidity to withstand the stress imposed upon it by operation of the tool and the configuration should be acceptable by fastening structures of powering tools and tool holders of present day commerce. The material of formation of the mounting shank is not critical so long as it withstands the forces imposed upon it, but it should be particularly noted that this material may be of a different nature than the material from which the annular cutter is formed.

Annular cutter 11 is of generally circularly cylindrical configuration with a plurality of spaced parallel outer flutes 23 defined on its radially outer surface and inner flutes 24 defined on its radially inner surface. These flutes are separated by outer lands 25 and inner lands 26 with the flutes on one surface of the cutter being defined between the flutes on the opposed surface so as to define a cutter body formed of material with somewhat uniform thickness of from thirty to seventy percent of the thickness of an annulus cut by the cutter. The inner surfaces of both inner and outer flutes are substantially coincident upon an axially aligned circle so that teeth defined in the end portions of the lands between the flutes cut radially adjacent portions of an annulus that is removed by the cutter from a workpiece. The flutes are defined on both the radially inner and outer cutter surfaces in an array of parallel spirals having an angle 45 with the axis of the cutter cylinder of up to seventy degrees, depending upon the other parameters of the cutter configuration and operation.

The sides 42 of each flute extend outwardly away from the inner surface of the flute at an angle 44 of between ten to sixty degrees to a radial line passing through the edge of the inner surface of the flute to create a buttress effect to strengthen the cutter lands adjacent either side of the flute, to better distribute stress in that area, and to provide greater structural strength and rigidity for the entire cutter. This structure is particularly important in the end portions of the cutter where cutting teeth are defined, as those areas have higher stress concentrations than medial areas of the cutter.

Each end portion of cutter 11 terminates on a plane that is perpendicular to the axis of the cutter. As seen in FIGS. 6–10, each end portion of each inner land 26 and outer land 25 defines a cutting tooth 27 having cutting edge 28 defined by the edge of the land side 42 that is forwardmost in the direction of rotation of the cutter, so that such cutting edges 28 will be defined on each alternating land side on both radially inner and outer sides of the cutter as illustrated.

The outwardly facing end surfaces 30 of both inner lands 26 and outer lands 25 slope inwardly toward the other end at an angle 48 of from five to thirty degrees from planar circular apex 29 which forms the forwardmost portion of each cutter end and extends through the inner surface of each radially inner and outer land as seen in FIGS. 7–9. The axially outwardly facing surface 30 of each land also slopes rearwardly in a circumferential direction opposite to the direction of cutter rotation at a shallow angle 47 of from one to five degrees, as shown in FIG. 3, to allow cutting action of cutting edge 28 and lessen or prevent friction between the circumferentially rearward portion of the land upon a surface being cut, which would increase heat generation and power consumption. Alternatively, as seen in FIG. 10, the medial and rearward portion 31 of the axially outwardly facing surface of each land may be removed by etching to provide relief especially in cutters with a large number of teeth.

Similar cutting teeth are defined at each end of the cutter so that it may cut annular holes by sequential use of both ends. The novel form and configuration of teeth of my cutter as specified are efficiently operative and preferred, but are not essential to a double ended cutter and other known configurations for metal cutting teeth may be used in my double ended cutter so long as they provide appropriate cutting action and chip removal. The embodiment of such other known tooth designs and configurations therefore is within the ambit and scope of my double ended cutter.

The cutter 11 is carried on and releasably joined to the shank arbor 14. The cylindrical surfaces of fastening groove 15 are spaced to fit immediately adjacent the radially inner and outer surfaces of the annular cutter and by reason of this construction aid the configurational maintenance of the cutter. The cutter is fastened in the shank arbor by at least one sunken head screw 17 threadedly carried in hole 18 defined through the outer surface of shank arbor 14 and into fastening groove 15. The screw 17, when tightened against the rearward portion of the annular cutter 11 in the fastening groove, maintains the cutter within the groove and prevents its rotation relative to the shank arbor. More than one fastening screw 17 may be used to interconnect the cutter and shank arbor if necessary.

The cutter may be releasably interconnected to the shank arbor in various other fashions, such as by adhesion, by conformally configuring both opposed surfaces of the fastening groove 15 so that the cutter may be threaded therein, by reducing the diametrical size of the shank arbor, eliminating the fastening groove and configuring the external surface of the arbor so that the cutter may be threaded thereon and by other similar means. These other fastening means, and especially adhesive fastening with dissoluble adhesive material, are within the ambit and scope of my invention, even though they may be less convenient of use and more costly of manufacture. The only requirements for the releasable fastening of the cutter to the shank arbor are that the interconnection be releasable, that it be sufficiently secure mechanically to allow application of appropriate torque to the cutter, and that it aid in maintaining the cutter's configurational integrity.

A second species of my cutter that provides a movable support to further aid configurational maintenance of the cutter during use is illustrated in FIGS. 4 and 5. Here mounting shank 10a is similar to the mounting shank of the first species except that the rearward portion of channel 19a in powering shaft 12a is enlarged to define chamber 32 to allow axial motion of a headed shaft carrying support disk. The annular cutter structure 11 remains the same as in the first species of my cutter.

Disk support shaft 33 having a diameter to slidably fit within power shaft channel 19a has diametrically larger head 34 that slidably fits within enlarged rearward portion 32 of the power shaft channel. The disk support shaft 33 defines in its cylindrical peripheral surface elongate pin groove 35 extending in axially parallel orientation to the head 34 to slidably receive pin 36 carried by a pressed fit in hole 37 defined in powering shaft 12a to allow slidable motion of the support shaft 33 in an axial direction in the power shaft channel but prevent its rotation relative to the mounting shank. The forward end portion of the disk support shaft 33 defines conical point 38 and threads 39 immediately rearwardly therefrom to releasably interconnect a support disk.

Circular support disk 40 has a diameter incrementally less than the diameter between opposed radially inner surfaces of inner lands 26 of the cutter so that the support disk may move in an axial direction within the annular cutter while yet supporting its circular configuration. The medial portion of the disk provides inwardly extending fastening flange 40a with threaded fastening hole 41 defined therethrough in an axially aligned orientation. The fastening hole 41 is configured to operatively engage threads 39 on the forward portion of disk support shaft 33 for releasable interconnection of the support disk thereon. Preferably at least one eccentrically positioned hole 44 is defined in the support disk to aid in rotating it for placement on or removal from the disk support shaft. Compression spring 43 extends between the forward surface of arbor channel 20 and the rearward surface of support disk 40 to bias the support disk to a forward position, but allow its motion rearwardly upon application of appropriate axially directed force.

The cutter construction specified allows the walls of the annular cutter 11 to be quite thin as compared to the wall thickeners of prior annular cutters. A cutter of one inch diameter defining ninety teeth, with other appropriate parameters, may have a thickness of the annulus defined by the inner and outer walls of one sixty-fourth of an inch and it is possible that the thickness might even be less with a greater number of teeth.

If the walls of the annular cutter 11 are sufficiently thin, they may not continuously maintain their circularly cylindrical configuration during heat treatment in the formation process or during operation, but rather may be deformed by thermal or mechanical forces imposed upon them to disrupt or render less efficient their cutting operation. The support disk 40, since it may move inwardly within the cutter channel as the cutting of a hole progresses, tends to maintain the circular configurational integrity of the cutter, especially at a point spacedly rearwardly adjacent the portion of the cutter not engaged within a workpiece. With use of this support disk, it is to be noted that chips and cut material may pass in the normal fashion through interior flutes as those flutes are not covered or blocked by this support structure and the chips will tend to stay in the radially internal flutes by reason of centrifugal force.

Having described the structure of my cutting tool, its operation may be understood.

A cutting tool is formed according to the foregoing specification with a mounting shank appropriately configured to interfit in a mechanism (not shown) for rotating the tool. The tool and a workpiece (not shown) in which a hole is to be defined are brought into adjacency and positionally maintained so that my tool is in axial alignment with a hole to be cut in the workpiece. The tool is then rotated in the proper direction, brought into contact and maintained with appropriate force against the workpiece to accomplish the cutting operation. Commonly my tool will be rotated relative to a workpiece such as by a rotary drill, either portable or stationary, a milling machine or the like.

As cutting edges 28 of cutting teeth 27 are brought into adjacency with the workpiece and appropriate force applied between the cutter and workpiece, chips will be cut by each cutting edge. The chips will be bent by the adjacent flute side that defines the cutting edge as the tool rotates, and as the cutting process continues the chips will move rearwardly and outwardly of the hole being cut along that flute sides as in the case of an ordinary solid rotary drill bit. The chips cut by the radially inner cutting edges will move rearwardly within the inner flutes 24 defined by the cutter, where they are maintained by centrifugal force, and ultimately will pass outwardly through chip channels 16 for disposition outside the cutter. It is to be noted that if the disk support 40 of the second species is used, the inner flutes 24 will allow chip passage past the disk support. In this cutting action, since the radially inner and outer cutting edges 28 extend toward each other to a point on a circle extending through their inner edges, an annular hole will be established in the workpiece.

When the hole is completed through a workpiece, the tool is removed and the remaining slug normally may be removed from the cutter merely by operation of gravity, or if not, then with an appropriately directed sharp motion to aid gravitational removal with some inertial force. If neither such removal method is effective, in the first species of cutter a punch may be inserted in powering shaft channel 19 and the slug forced out of the tool by use of the punch. In the second species of tool the disk shaft 33 acts as an ejector for the slug.

When the forward end of the cutter has been used to such extent that cutting potential is reduced sufficiently to become impractical or uneconomical, the cutter is removed from the shank arbor 14, turned end for end with the worn cutter end adjacent the shank arbor, and reconnected to the shank arbor in this orientation so that the second unused end may be used. In the mechanically attached cutter illustrated this is accomplished by loosening fastening screw 17 to allow removal of the cutter from the shank arbor, placing the cutter in proper position and retightening the fastening screw to interconnect the two elements. If an adhesive is used to interconnect the cutter and shank arbor (not shown), the adhesive bond between adjacent surfaces of the cutter and shank arbor is released by solvent, heat or other means appropriate to the particular adhesive and the cutter is removed, turned end for end and refastened to the shank arbor by a new adhesive bond to again interconnect the two members.

It should be noted that the term "adhesive" is used to include various known types of thermally active or chemically dissolvable polymeric materials and metallic compounds such as solders that thermally set at a temperature below the tempering temperature of the materials used in formation of my tool.

The operation of the second species of my invention is substantially the same as that described for the first species. The tool is applied to the workpiece in the same fashion and the point 38 of the disk support shaft 33 may serve to center the tool, if desired, as in its null position it projects forwardly beyond the forwardmost projection of the cutter. As the second species of tool is rotated and cutting instituted, the disk support shaft moves rearwardly against the bias of spring 43 responsively to the penetration of the cutting tool into a workpiece to correspondingly move the support disk 40 rearwardly. As chips are generated by the radially inner teeth, they will be removed through the inside flutes 24 past the periphery of the support disk 40 to ultimately move rearwardly of the support disk and ultimately out of the cutter channel through chip channels 16. The support disk 40 will move rearwardly against the bias of spring 43 so that when the tool is removed from a finished hole, the spring bias will tend to move the support disk forwardly relative to the cutter to its normal null position to aid in removing a plug from a cut hole.

It should be noted that my tool may have substantially more cutting teeth defined therein than a tool of the same outside diameter formed with thicker cutter walls. The cutter thickness and number of cutting teeth in the illustrations is illustrative only and not intended to be limiting. The actual ratio of cutter thickness to diameter could be substantially reduced and the number of teeth substantially increased. If the number of cutting teeth increases substantially, it may not be practical to create separate chip channels 16 for each inner flute 24. If this situation arises, the cutter 11 may be maintained on an arbor that has an external diameter incrementally less than the internal diameter of the cutter by a separate fastening band having a diameter slightly less than the external diameter of the cutter extending over the rearward portion of the cutter so that the fastening band may be heated to cause expansion for placement and subsequently cooled to cause frictional fastening of the cutter on the shank arbor. With this fastening, the inner flutes will remain open and chips in them may pass rearwardly therethrough past the shank arbor. This form of fastening is obvious to one skilled in the art and therefore is not illustrated or claimed.

It should further be noted that the support disk provides support for the cylindrical cutter to aid in maintaining its circularity and prevent configurational variations resulting from thermal variations, stresses or vibrational or other forces exerted upon the cutter, especially when the cutter is quite thin.

The foregoing description of my cutter is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by letters patent, and

What I claim is:

1. A rotary tool for cutting holes in a rigid workpiece, comprising in combination:

an elongate mounting shank having first and second end portions with
      a powering shaft at the first end portion, and
      a diametrically larger cylindrical shank arbor having means for releasably fastening a circularly annular cutter at the second end portion distal from the powering shaft; and
   a circularly annular cutter, releasably fastened in axial alignment to the shank arbor distal from the powering shaft, defining a plurality of spirally arrayed alternating flutes and lands on radially inner and outer surfaces, each flute having
      an inner surface coincident on a common circle concentric with the axis of the annular cutter, and
      angulated sides extending outwardly from the inner surface of each flute and away from each other, and
   each land defining a cutting tooth at each end of each angulated side facing the direction of rotation of the cutter.

2. A tool for cutting an annular hole in a rigid workpiece responsive to rotary motion and force between the tool and the workpiece, comprising in combination:

a mounting shank, having
      a powering shaft, having first and second end portions with means for interconnection with a holding device, at the first end portion of the mounting shank, and
      a diametrically larger cylindrical shank arbor extending in axial alignment from the second end portion of the mounting shank, said cylindrical shank arbor having means for releasably fastening an annular cutter to the second end portion distal from the powering shaft; and
   a circularly annular cutter releasably fastened in axial alignment to the shank arbor and defining a medial channel and a plurality of spirally arrayed alternating similar flutes and similar lands on radially inner and outer surfaces, each of said flutes having
      an inner surface substantially coincident on a common circle concentric with the axis of the annular cutter,
      angulated sides extending outwardly from the inner surface of each flute and away from each other, and
      each land between adjacent flutes defining a cutting tooth at each axially outer end of each land side facing the direction of rotation of the annular cutter, each said cutting tooth being coplanar.

3. The tool of claim 2 wherein each flute on the radially inner surface of the annular cutter is defined between adjacent flutes on the radially outer surface of the annular cutter.

4. The tool of claim 2 further characterized by the sides of the flutes being angulated to a radial line of the annular cutter extending therethrough at a smaller included angle of between ten and sixty degrees.

5. The tool of claim 2 further characterized by the lands and flutes on both radially inner and outer sides of the cutter extending in spiral orientation at an angle of up to seventy degrees to the axis of the annular cutter.

6. The tool of claim 2 further characterized by the end surfaces of each radially inner and outer land sloping axially inwardly at an angle of between 5 and 30 degrees.

7. The tool of claim 6 further characterized by the end surfaces of each radially inner and outer land sloping in a circumferential direction away from the forward edge of a cutting tooth at an angle of from one to five degrees.

8. The tool of claim 6 further characterized by the end surfaces of each radially inner and outer land spacedly rearwardly of each cutting tooth being etched to provide relief for the cutting tooth.

9. The tool of claim 2 wherein the releasable means for fastening the annular cutter to the shank arbor comprise an annular fastening groove defined in the shank arbor to receive an end portion of the cutter and at least one fastening screw extending in threaded engagement in at least one hole defined through the cylindrical peripheral portion of the shank arbor to the annular fastening groove.

10. The tool of claim 2 further characterized by the powering shaft and shank arbor each defining communicating axially aligned channels extending therethrough to slidably and irrotatably carry a support disk shaft releasably carrying a support disk for axial motion in the medial channel of the cutter to aid configurational maintenance of the cutter during use, said support disk being biased to a position distal from the mounting shank.

11. The tool of claim 2 further characterized by the shank arbor defining a plurality of chip channels extending from the axially inward portion of each radially inner flute radially outwardly through the shank arbor to allow passage of cuttings through the chip channels and outwardly from the medial channel of the cutter.

12. An annular tool for cutting a hole in a metallic workpiece responsive to rotary motion of the tool and force between the tool and the workpiece, comprising in combination:

a mounting shank, having a powering shaft, having first and second end portions with means at the first end portion to releasably and irrotatably interconnect with a powering tool for rotation, and a diametrically larger, circularly cylindrical shank arbor carried by the powering shaft to extend in axial alignment from the second end of the powering shaft, said shank arbor having an annular fastening groove defined in the second end portion in axial alignment with the powering shaft to receive an end portion of a cylindrical cutter and at least one fastening screw extending in threaded engagement in a hole defined from the external peripheral surface of the shank arbor to the annular fastening groove, and a plurality of chip channels extending from the axially inner portion of the fastening groove radially outwardly through the shank arbor to allow the passage of cuttings through the chip channels and radially outwardly from the fastening groove;

a circularly annular cutter, with end portions perpendicular to its axis, releasably fastened in the fastening groove defined in the shank arbor, said annular cutter defining a plurality of alternating similar flutes and similar lands on radially inner and outer surfaces, said flutes and lands extending in spiral orientation at an angle of up to seventy degrees to the axis of the annular cutter and each of said flutes on the radially inner surface of the annular cutter being defined between adjacent flutes on the radially outer surface of the annular cutter, on both radially inner and outer surfaces of the annular cutter having inner surfaces coincident on a common circle concentric with the axis of the annular cutter, and on both radially inner and outer surfaces of the annular cutter having angulated sides extending outwardly from the inner surface of each flute and away from each other at a smaller included angle to a radial line of the annular cutter extending through the angulated side of between ten and sixty degrees, and each of said lands between adjacent flutes defining a cutting tooth at each end of each land side facing the direction of rotation of the annular cutter, having end surfaces sloping axially inwardly at an angle of between five and thirty degrees, and having end surfaces sloping in a circumferential direction away from the forward edge defining a cutting tooth.

* * * * *